(12) United States Patent
Chen

(10) Patent No.: US 8,885,585 B2
(45) Date of Patent: Nov. 11, 2014

(54) METHOD, APPARATUS, AND SYSTEM FOR TRIGGERING RESOURCE CONFIGURATION

(75) Inventor: Yanyan Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 69 days.

(21) Appl. No.: 13/324,836

(22) Filed: Dec. 13, 2011

(65) Prior Publication Data

US 2012/0082032 A1  Apr. 5, 2012

Related U.S. Application Data

(63) Continuation of application No. 12/988,117, filed as application No. PCT/CN2009/070308 on Jan. 23, 2009.

(30) Foreign Application Priority Data

Feb. 4, 2008  (CN) .......................... 2008 1 0065290

(51) Int. Cl.
*H04J 1/16* (2006.01)
*H04W 72/12* (2009.01)

(52) U.S. Cl.
CPC ...... *H04W 72/1278* (2013.01); *H04W 72/1252* (2013.01)
USPC ........... 370/329; 370/322; 370/348; 455/450; 455/451

(58) Field of Classification Search
CPC ..... H04L 5/001; H04L 5/0007; H04L 1/1887; H04L 1/0026; H04L 1/0073; H04L 67/325; H04L 69/24; H04L 47/10; G06F 17/30; H04W 68/00; H04W 72/042; H04W 72/1284
USPC ........... 370/229, 232; 455/419, 466, 511, 515
See application file for complete search history.

(56) References Cited

U.S. PATENT DOCUMENTS 5,946,612 A   8/1999  Johansson et al.
6,640,105 B1  10/2003 Shin
(Continued)

FOREIGN PATENT DOCUMENTS

CN  1703110 A  11/2005
CN  1747359 A  3/2006
(Continued)

OTHER PUBLICATIONS

3GPP TS 25.331 V4.7.0 "3rd Generation Partnership Project; Technical Specification Group Radio Access Network; Radio Resource Control (RRC); Protocol Specification (Release 4)", Sep. 2002. pp. 1, 185-202 and 850-859.*

(Continued)

*Primary Examiner* — Awet Haile
(74) *Attorney, Agent, or Firm* — Huawei Technologies Co., Ltd.

(57) ABSTRACT

A method, apparatus, and system for triggering resource configuration are disclosed. The method includes: if user equipment (UE) in Cell_Paging Channel (Cell_PCH) state figures out that the total amount of buffer occupancy at the radio link control (RLC) layer or the Transport Channel Traffic Volume is larger than configured threshold, the UE carries an indication in a MEASUREMENT REPORT message and transmit the message to the network side, wherein the indication is used to trigger the network side to configure resources for the UE. With the present invention, the resource configuration is quickly triggered, and the delay of the UE in the data transmission is minimized.

20 Claims, 3 Drawing Sheets

(56) References Cited

U.S. PATENT DOCUMENTS

| | | | |
|---|---|---|---|
| 2004/0127243 A1* | 7/2004 | Sarkkinen | 455/511 |
| 2005/0083943 A1 | 4/2005 | Lee et al. | |
| 2005/0250504 A1* | 11/2005 | Mikola | 455/450 |
| 2005/0259662 A1 | 11/2005 | Kim et al. | |
| 2006/0140154 A1 | 6/2006 | Kwak et al. | |
| 2006/0280145 A1 | 12/2006 | Revel | |
| 2007/0060153 A1* | 3/2007 | Torsner et al. | 455/450 |
| 2007/0147370 A1* | 6/2007 | Hasegawa | 370/390 |
| 2007/0281708 A1 | 12/2007 | Bakhuizen et al. | |
| 2008/0008152 A1 | 1/2008 | Lohr et al. | |
| 2009/0023436 A1* | 1/2009 | Wu | 455/419 |
| 2009/0034474 A1 | 2/2009 | Yavuz et al. | |
| 2009/0088195 A1 | 4/2009 | Rosa et al. | |
| 2010/0067454 A1* | 3/2010 | Lee et al. | 370/329 |
| 2012/0026943 A1* | 2/2012 | Lee et al. | 370/328 |

FOREIGN PATENT DOCUMENTS

| | | |
|---|---|---|
| CN | 1863361 | 11/2006 |
| CN | 1867163 A | 11/2006 |
| CN | 101072431 A | 11/2007 |
| CN | 101090560 A | 12/2007 |
| CN | 101111050 A | 1/2008 |
| EP | 1509012 A2 | 2/2005 |
| KR | 20070092441 A | 9/2007 |
| WO | 2005078954 A1 | 8/2005 |
| WO | 2006005223 A1 | 1/2006 |
| WO | 2006043782 A1 | 4/2006 |
| WO | 2008051466 A2 | 5/2008 |
| WO | 2009055662 A2 | 4/2009 |
| WO | 2009055804 A2 | 4/2009 |

OTHER PUBLICATIONS

3GPP "Direct transition to DCH" 3GPP TSG-RAN WG #46bis, Tdoc R2-051183, Beijing, China Apr. 4-8, 2005.*

European Search Report for European Patent Application No. 09710164.6, dated Sep. 12, 2010, total 10 pages.

3GPP TS 25.331, V7.0.0, "3rd Generation Partnership Project; Technical Specification Group Radio Access Network; Radio Resourse Control (RRC); Protocol Specification (Realease 7)", Mar. 2006, 1249 pages total.

PCT publication and International Search Report from P.R. China in International Application No. PCT/CN2009/070308, mailed May 7, 2009, 22 pages.

English Translation of the Written Opinion of the International Search Authority for International application No. PCT/CN2009/070308, mailed May 7, 2009, total 3 pages.

3GPP TS 25.321 V4.3.0: "3rd Generation Partnership Project;Technical Specification Group Radio Access Network; MAC protocol specification (Release 4)",dated Dec. 2001, 45 pages total.

3GPP TR 25.922 V7.1.0: "3rd Generation Partnership Project;Technical Specification Group Radio Access Network; Radio resource management strategies(Release 7)", dated Mar. 2007, 95 pages total.

TSG-RAN Working Group 2 meeting #41Tdoc R2-040916: "Direct transition to CELL_DCH",Ericsson,Montreal, Canada, dated May 10-14, 2004, 4 pages total.

3GPP TSG-RAN WG #45bisTdoc R2-050166: "Direct transition to DCH", Ericsson, TeliaSonera, Sophia Antipolis, France, dated Jan. 10-14, 2005, 10 pages total.

3GPP TSG-RAN WG #46bis Tdoc R2-051183: "Direct transition to DCH",Ericsson, TeliaSonera, Beijing, China dated Apr. 4-8, 2005, 10 pages total.

First Office Action of related U.S. Appl. No. 12/988,117, mailed Apr. 10, 2012, 17 pages total.

Search report issued in corresponding EP application No. 12188933.1, Dec. 5, 2012, total 6 pages.

Office action issued in corresponding U.S. Appl. No. 12/988,117, Nov. 16, 2012, total 39 pages.

* cited by examiner

METHOD, APPARATUS, AND SYSTEM FOR TRIGGERING RESOURCE CONFIGURATION

This application is a continuation of U.S. patent application Ser. No. 12/988,117, filed on Feb. 23, 2011, which is a National Stage of International Application No. PCT/CN2009/070308, filed on Jan. 23, 2009, which claims priority to Chinese Patent Application No. 200810065290.2, filed on Feb. 4, 2008, the disclosures of which are hereby incorporated by reference in their entireties.

FIELD OF THE INVENTION

The present invention relates to the mobile communication field, and in particular, to a method, apparatus, and system for triggering resource configuration.

BACKGROUND OF THE INVENTION

For a mobile communication system, user equipment (UE) in Cell_Paging Channel (Cell_PCH) state cannot receive and send data directly before the feature of receiving data from High Speed Downlink Packet Access (HSDPA) channel by the UE in Cell_PCH state channel is introduced. For example, when the UE in Cell_PCH state wants to transmit uplink data, the UE must initiate a CELL UPDATE procedure in order to enter into other states. The UE can transmit the uplink data only after the UE completes the CELL UPDATE procedure and enters a state in which the UE is allowed to transmit uplink data directly.

In the related art, a UE in Cell_Forward Access Channel (Cell_FACH) state can transmit the uplink data directly. After the feature of receiving data from HSDPA channel by the UE in Cell_PCH state being introduced, the UE in Cell_PCH state can reserve the resources of the UE in Cell_FACH state. When the UE has uplink data to transmit, the UE can perform state transition from Cell_PCH state to Cell_FACH state directly, so that the UE can send and receive data by using the reserved resources in Cell_FACH state, without initiating CELL UPDATE procedure.

The related art has the following disadvantages:

When the UE in Cell_PCH state wants to transmit a large volume of uplink traffic, the resources reserved by the UE in CELL_FACH state may not satisfy the quality of the service. In this case, only after the radio resource control (RRC) state machine of the UE is set to Cell_FACH state, the UE could indicate the network side to configure resources that are more suitable to meet the quality of the service for the UE. Then the network side can determine to configure suitable resources for the UE to transmit the uplink data accordingly. Obviously, this solution for triggering the resource configuration may cause a delay for the UE in subsequent data transmission.

SUMMARY OF THE INVENTION

The present invention provides a method, apparatus, and system for triggering resource configuration, with which data transmission delay of UE caused by the resource configuration procedure could be minimized.

According to a first aspect of the invention a method for triggering resource configuration includes in its first implementation form:

by user equipment, UE, in Cell_Paging Channel, Cell_PCH, state, if figuring out that a Transport Channel Traffic Volume of the UE or total amount of buffer occupancy at a radio link control, RLC, layer of the UE is larger than a configured threshold, carrying an indication in a MEASUREMENT REPORT message and transmitting the message to the network side, wherein the indication is used to trigger the network side to configure resources for the UE.

According to a second aspect of the invention a UE for triggering resource configuration includes a processing module and a sending module.

The processing module is configured to: carry an indication in a MEASUREMENT REPORT message transmitted to a network side if the UE is in Cell_Paging Channel, Cell_PCH, state and figures out that a Transport Channel Traffic Volume of the UE or total amount of buffer occupancy of a radio link control, RLC, layer of the UE is larger than a configured threshold, wherein the indication is used to trigger the network side to configure resources for the UE; and send the MEASUREMENT REPORT message through the sending module.

The method for triggering resource configuration according to said first aspect of the invention includes in its second implementation form:

receiving, by a NodeB, a media access control packet data unit, MAC PDU, from user equipment, UE, wherein the MAC PDU carries scheduling information, and the scheduling information comprises a numeric value of a total enhanced dedicated channel, E-DCH, buffer status, TEBS, field;

obtaining, by the NodeB, the numeric value of the TEBS field from the scheduling information in the received MAC PDU, and sending, by the NodeB, an indication to a radio network controller, RNC, when the numeric value of the TEBS field is larger than a configured threshold, wherein the indication is used to trigger the RNC to configure resources for the UE.

According to a third aspect of the invention a NodeB for triggering resource configuration includes a comparing module and a sending module.

The comparing module is configured to: obtain a numeric value of a total enhanced dedicated channel, E-DCH, buffer status, TEBS, field from scheduling information carried in a media access control packet data unit, MAC PDU, sent from user equipment, UE, and send an indication to a radio network controller, RNC, through the sending module when determining that the numeric value is larger than a configured threshold, wherein the indication is used to trigger the RNC to configure resources for the UE.

According to a fourth aspect of the invention a system for triggering resource configuration includes a NodeB and an RNC.

The NodeB is configured to: receive a media access control packet data unit, MAC PDU, from user equipment, UE, obtain a numeric value of a total enhanced dedicated channel, E-DCH, buffer status, TEBS, field from scheduling information carried in the MAC PDU, and send an indication to the RNC when determining that the numeric value is larger than a configured threshold, wherein the indication is used to trigger the RNC to configure resources for the UE; and the RNC is adapted to configure resources for the UE after receiving the indication transmitted by the NodeB.

In the present invention, if the UE in Cell_PCH state figures out that the total amount of buffer occupancy at the RLC layer of the UE or the Transport Channel Traffic Volume of the UE is larger than a configured threshold, the UE carries an indication in a MEASUREMENT REPORT message reported to the network side, where the indication is used to trigger the network side to configure resources for the UE. In this way, the network side can quickly configure resources for the UE according to the requirements of the UE. Compared with the related art, the present invention reduces the delay of the UE in the data transmission.

In the present invention, the NodeB receives a MAC PDU that carries scheduling information from the UE, where the scheduling information includes the numeric value of the TEBS field; the NodeB obtains the numeric value of the TEBS field from the scheduling information in the MAC PDU, and sends an indication to the RNC when the numeric value of the TEBS field is larger than the configured threshold, where the indication is used to trigger the RNC to configure resources for the UE. In this way, the network side can quickly configure resources for the UE according to the requirements of the UE. Compared with the related art, the present invention reduces the delay of the UE in the data transmission.

DETAILED DESCRIPTION OF THE EMBODIMENTS

Figure 1:
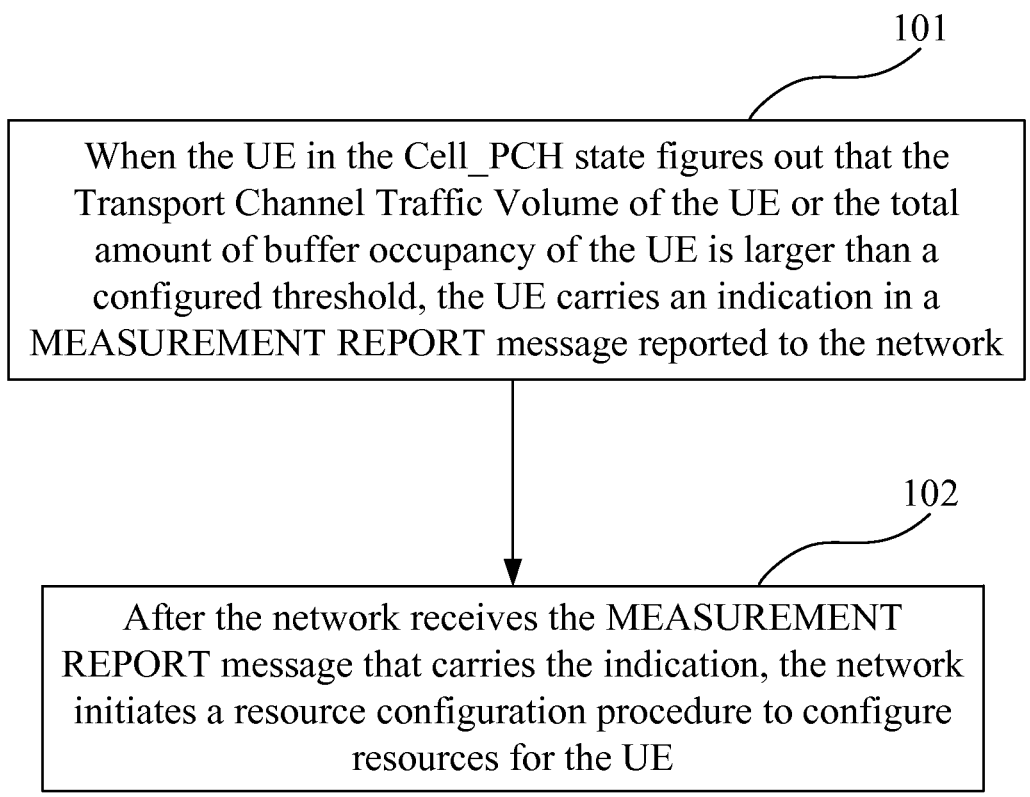
FIG. 1 is a flowchart of a method in an embodiment of the present invention.

For better understanding of the objective, technical solution and merits of the present invention, the present invention is hereinafter described in detail with reference to the accompanying drawings.

The inventor of the present invention discovers the following problems in the prior art: UE can send an ordinary measurement report message that carries a traffic volume measurement result to the network side only after the UE enters Cell_FACH state, that is, only after the UE and the RNC set the RRC state machine of the UE to Cell_FACH state.

Accordingly, after the network side receives the measurement report message that carries the traffic volume measurement result, the network side may initiate a resource configuration procedure, where the resource may be radio bearer resources, physical resources, or transport channel resources. The resource configuration procedure initiated by the network side may be radio bearer setup, radio bearer reconfigure, or radio bearer release procedure; physical channel establish, physical channel reconfiguration, or physical channel release procedure; or transport channel establish, transport channel reconfiguration, or transport channel release procedure.

That is, when the UE in Cell_PCH state triggers the RNC to configure resources for the UE due to a large amount of uplink data, the UE must enter Cell_FACH state, subsequently UE transmits a measurement report message that carries the traffic volume measurement result. Then the network side can determine to configure proper resources for the UE to transmit the afterwards uplink data.

However, when the UE in Cell_PCH state wants to send or receive data, the UE needs to initiate a specially defined MEASUREMENT REPORT message on a random access channel (RACH), where the MEASUREMENT REPORT message is used to trigger the UE to perform state transition from Cell_PCH state to Cell_FACH state automatically and includes the information "Measured Results on RACH" that is measured by the UE and indicates the quality of the current downlink. In this way, the UE performs state transition from Cell_PCH state to Cell_FACH state. For the network side, after the RNC receives the measurement report message, the RNC forwards the information "Measured Results on RACH" to the NodeB; the NodeB can use this information to determine the Modulation and Coding Scheme (MCS) and DL transmit power for the HS-SCCH and HS-PDSCH transmissions for the UE. After receiving the MEASUREMENT REPORT message of the UE on the RACH, the RNC also sets the UE state in the RNC to Cell_FACH state. That is, with the transmission on the RACH, the UE and the RNC believe that the UE automatically performs state transition into Cell_FACH state. Then, the UE and the network side may use the resources in Cell_FACH state that are previously configured by the RNC.

Thus, the inventor finds the following solution: The specifically defined MEASUREMENT REPORT message that the UE sends for the purpose of triggering state transition to Cell_FACH state may be used to carry the result of traffic volume measurement. In this way, when the network side receives the MEASUREMENT REPORT message containing the result of traffic volume measurement, the network side can quickly decide to configure resources for the UE according to the requirements.

Thus, multiple embodiments of the present invention are provided and are hereinafter described in detail. It should be noted that the RNC mentioned in each embodiment is an example only and may be other similar radio network device control devices.

FIG. 1 is a flowchart of a method in an embodiment of the present invention. The method includes the following steps:

Step 101: When the UE in Cell_PCH state figures out that the Transport Channel Traffic Volume of the UE or the total amount of buffer occupancy at the RLC layer is larger than a configured threshold, the UE carries an indication in a MEASUREMENT REPORT message reported to the network side to indicate that the current calculation result is larger than the configured threshold.

The indication may also be used to identify the total amount of buffer Occupancy at the RLC layer of the UE or the Transport Channel Traffic Volume of the UE is larger than a configured threshold. Specifically, the indication may be called a traffic volume indication information. The network side can decide whether to trigger the resource configuration for the UE according to the indication.

In addition, the indication may be carried in the MEASUREMENT REPORT message in the following cases: 1. The indication is carried only when the current calculation result is larger than the configured threshold; 2. An indication is included in the MEASUREMENT REPORT message; the indication is set to true if the Transport Channel Traffic Volume is larger than a configured threshold, or else, the indication identifier is false; 3. An indication is used to indicate that the UE fulfills with 4a event (the 4a event is defined as the fact that a Transport Channel Traffic Volume of UE becomes larger than a configured threshold).

Step 102: After the network side receives the MEASUREMENT REPORT message that includes the indication, the network side initiates a resource configuration procedure to configure resources for the UE.

Certainly, the MEASUREMENT REPORT message that carries the indication is only one of factors based on which the network side determines whether to initiate the resource configuration procedure or not, which shows the current status of requirements for resources for the data transmission of the UE. After receiving the MEASUREMENT REPORT message that carries the indication, the network side may also determine not to initiate the resource configuration procedure according to factors such as the resource usage conditions in the current cell. This depends on the radio resource management algorithm of the network side.

The resource configuration which is triggered may be radio bearer, physical resources or transport channel resources. Accordingly, the resource configuration procedure initiated by network side may be radio bearer setup, radio bearer reconfigure, or radio bearer release procedure; physical channel establish, physical channel reconfiguration, or physical channel release procedure; or transport channel establish, transport channel reconfiguration, or transport channel release procedure. For example, the network side may allocate more radio bearer resources to the UE, or configure dedicated channel for the UE to meet the traffic volume requirements of service carried by the UE.

After the UE receives the resource configuration message and successfully complete the resource configuration procedure, the UE may transmit data by using the resources allocated by the network side.

Figure 2:
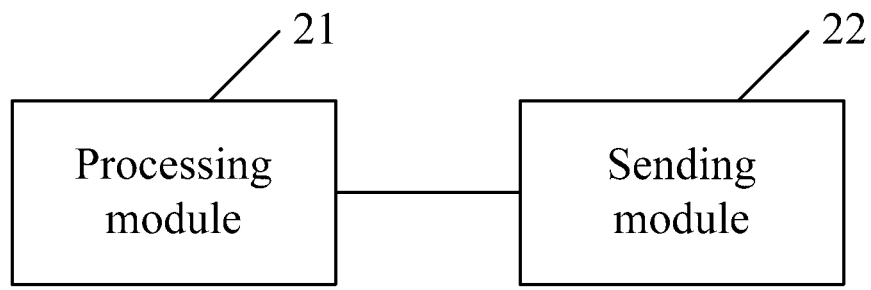
FIG. 2 shows a structure of a UE in the method embodiment shown in FIG. 1.

FIG. 2 shows a structure of the UE in the above embodiment of the present invention. The UE includes a processing module 21 and a sending module 22.

The processing module is configured to: when the UE is in Cell_PCH state and figures out that the Transport Channel Traffic Volume of the UE or the total amount of buffer occupancy at the RLC layer of the UE is larger than a configured threshold, carry an indication in a MEASUREMENT REPORT message reported to the network side, and send the MEASUREMENT REPORT message through the sending module 22.

As mentioned above, the indication carried in the MEASUREMENT REPORT message is used to trigger the network side to configure proper resources for the UE, and is not further described.

Figure 3:
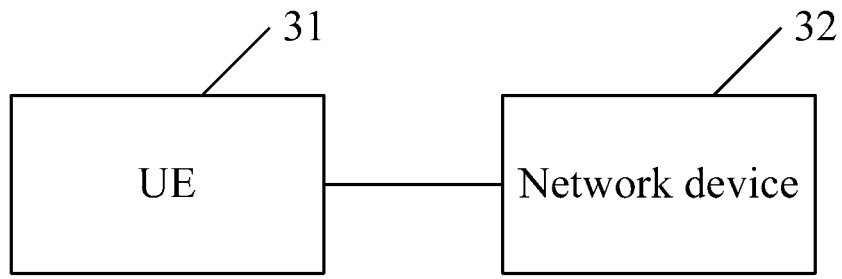
FIG. 3 shows a structure of a system in the method embodiment shown in FIG. 1.

FIG. 3 shows a structure of the system in the above embodiment of the present invention. The system includes a UE 31 and a network device 32.

The UE 31 is configured to carry an indication in a MEASUREMENT REPORT message reported to the network device when the UE 31 is in Cell_PCH state and figures out that the Transport Channel Traffic Volume of the UE 31 or the total amount of buffer occupancy at the RLC layer of the UE 31 is larger than the configured threshold, where the indication is used to trigger the network device to configure resources for the UE 31. As mentioned above, the indication may indicate that the UE 31 complies with the 4a event.

The network device 32 is configured to initiate a resource configuration procedure to allocate proper resources to the UE after receiving the MEASUREMENT REPORT message that carries the indication.

The UE 31 in the preceding system may further include the processing module 21 and the sending module 22 shown in FIG. 2. The specific functions of the two modules are not further described.

In embodiments corresponding to FIG. 1, FIG. 2, and FIG. 3, for the UE in Cell_PCH state, when the buffer occupancy of the RLC layer of the UE or the Transport Channel Traffic Volume is larger than configured threshold, the UE carries an indication in the MEASUREMENT REPORT message and transmit the message to the network side. The indication identifies the traffic volume of the UE. The UE does not report the message according to the amount of buffer occupancy for each radio bearer or each RLC buffer of the UE, so that the UE in Cell_PCH state can report the traffic volume measurement result information to the network side at the same time triggering the state transition to Cell_FACH state. In addition, only one MEASUREMENT REPORT message needs to be sent to the network side, so that the network side can quickly know the traffic volume of the UE and initiate a resource configuration procedure to allocate suitable resources to meet the requirement of the UE. For example, the UE does not have a dedicated transport channel before sending the MEASUREMENT REPORT; after the RNC receives a traffic volume indication, the RNC knows that the UE needs more resources to send data, and then configures a dedicated transport channel for the UE in the subsequent reconfiguration procedure. In this way, the RNC does not need to wait two measurement report messages to determine to configure dedicated resources for the UE, thus reducing the delay of the UE due to the resource allocation to meet the traffic volume requirements.

In this embodiment, the RNC may set the NodeB to periodically report information such as the Transport Channel Traffic Volume of the UE or the total amount of buffer occupancy at the RLC layer of the UE, so that the RNC may know the usage conditions of the transmission channel resources of the UE in time. In this way, the RNC may dynamically configure and adjust the resources of the UE, thus utilizing the resources effectively. Further, if the uplink transmission channel used by the UE is an enhanced dedicated channel (E-DCH), the RNC knows the overall resource utilization in the current cell by knowing the allocation and/or usage of common E-DCH resources through the NodeB, thus utilizing the resources in the cell effectively.

Figure 4:
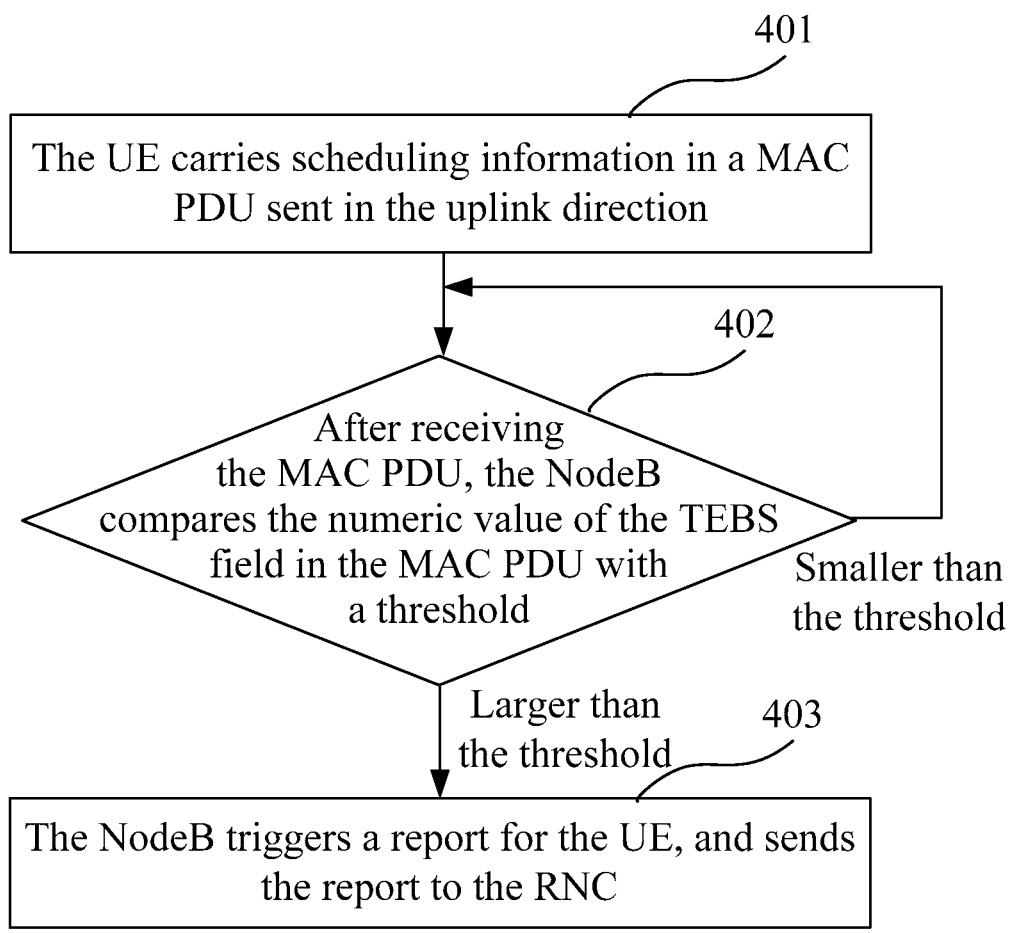
FIG. 4 is a flowchart of another method in an embodiment of the present invention.

FIG. 4 is a flowchart of another method in an embodiment of the present invention. The method includes the following steps:

Step 401: The UE carries scheduling information in a MAC PDU that is sent in the uplink direction.

The numeric value of the Total E-DCH Buffer Status (TEBS) field in the scheduling information is the total amount of buffer occupancy at the RLC layer that needs to be sent. That is, the numeric value of the TEBS field may represent the amount of data that the UE needs to send.

Step 402: After receiving the MAC PDU, the NodeB compares the numeric value of the TEBS field in the MAC PDU with a configured threshold. If the numeric value of the TEBS field is larger than the threshold, the procedure proceeds to step 403.

Otherwise, the NodeB may not execute the operation. Then, the procedure may go back to step 402.

In addition, the threshold that the NodeB uses for the purpose of comparison in this step needs to be set in advance. For example, the threshold may be set by the RNC of the network side, and sent to the NodeB. In another example, the RNC may configure the threshold for the NodeB through a NodeB Application Part (NBAP) signaling procedure. Certainly, other setting solutions may also be used.

Step 403: The NodeB sends an indication to the RNC.

After receiving the indication, the RNC may know that the amount of data to be sent by the UE is larger than the threshold. Then, the RNC may determine to initiate a reconfiguration procedure to meet the traffic volume requirements of the UE.

The indication may also carry the allocation and/or usage of common E-DCH resources on the NodeB, so that the RNC allocates resources to the UE accordingly.

The NodeB may also collect the Transport Channel Traffic Volume that the UE needs to send within a certain period of time or the total amount of buffer occupancy at the RLC layer according to the TEBS value reported by the UE in the period of time, and periodically report the collected result to the RNC. This measurement result may be the average value of the data that the UE needs to send within such a period of time or represent the difference between the data to be sent in this period time and the data to be sent in the previous period. Further, the NodeB may periodically report the allocation and/or usage of the common E-DCH resources on the NodeB to the RNC. This periodical report may be based on the configuration of the RNC, such as report period and/or report information.

This embodiment may be extended as follows: Another indication threshold may be set on the NodeB; when the TEBS of the UE is smaller than this threshold, the NodeB reports another indication to the RNC; the RNC may reconfigure the resources of the UE according to this indication so as to save network resources.

Figure 5:
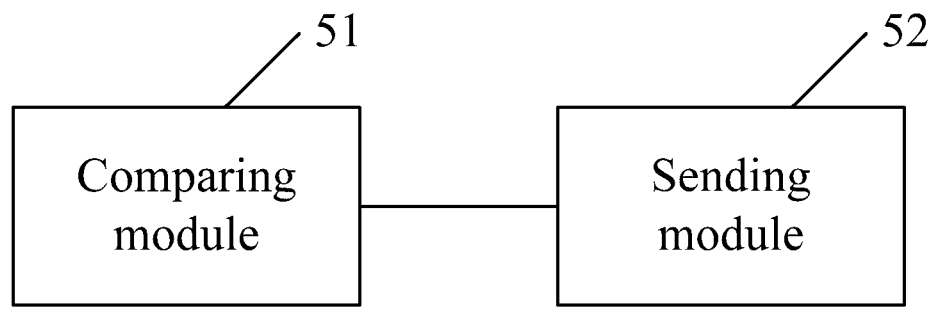
FIG. 5 shows a structure of a NodeB in the method embodiment shown in FIG. 4.

FIG. 5 shows a structure of the NodeB in the above embodiment of the present invention. The NodeB includes a comparing module 51 and a sending module 52.

The comparing module 51 is configured to: obtain the numeric value of the TEBS field of the UE from the scheduling information carried in the MAC PDU sent from the UE; compare the numeric value with a configured threshold; and send an indication to the RNC through the sending module 52 when determining that the numeric value is larger than the threshold. The indication is used to trigger the RNC to configure resources for the UE to meet the traffic volume requirements of the UE.

In this embodiment, another threshold may also be set, so that when the traffic volume of the UE is reduced, the network side is triggered to reconfigure resources for the UE. In this way, the network resources may be saved.

Specifically, the comparing module 51 is further configured to: compare the numeric value of the TEBS field with another threshold, and send an indication to the network side through the sending module 52 when determining that the numeric value is smaller than the threshold, where the indication is used to trigger the RNC to configure resources for the UE.

Figure 6:
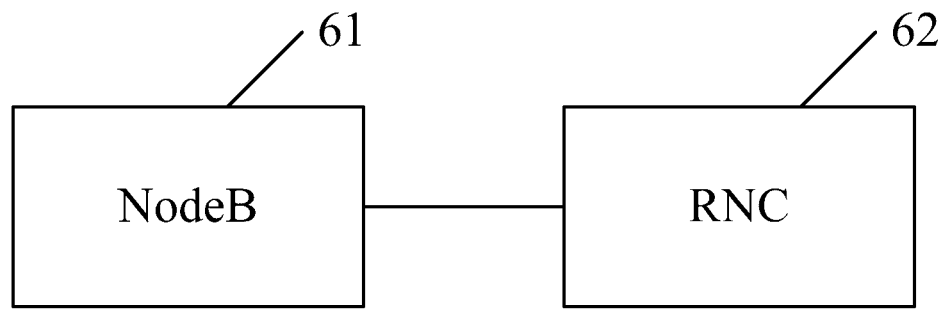
FIG. 6 shows a structure of a system in the method embodiment shown in FIG. 4.

FIG. 6 shows a structure of the system in the above embodiment of the present invention. The system includes a NodeB 61 and an RNC 62.

The NodeB 61 is configured to: receive a MAC PDU from the UE, obtain the numeric value of the TEBS field of the UE from the scheduling information carried in the MAC PDU, compare the numeric value of the TEBS field in the MAC PDU with a configured threshold, and send an indication to the RNC 62 when the numeric value is larger than the threshold. As mentioned above, the indication is used to trigger the RNC to configure resources for the UE.

The RNC 62 is adapted to configure resources for the UE after receiving the indication sent from the NodeB 61. The resource configuration may be performed through a reconfiguration procedure.

As mentioned above, the NodeB in the preceding system may further include the comparing module 51 and the sending module 52 shown in FIG. 5. The specific functions of these two modules are not further described.

In the preceding embodiments shown in FIG. 4, FIG. 5, and FIG. 6, the NodeB receives a MAC PDU from the UE, and compares the numeric value of the TEBS field in the MAC PDU with a configured threshold; when the numeric value of the TEBS field is larger than the threshold, the NodeB sends an indication to the RNC; the RNC determines to configure proper resources for the UE according to the received indication. Thus, in the preceding embodiments, after the NodeB receives a MAC PDU, the NodeB compares the numeric value of the TEBS field with the configured threshold, and sends a report to the RNC immediately. In this way, the network side can configure resources for the UE immediately when the traffic volume of the UE is large, which overcomes the problem in the prior art in which a long delay occurs in the procedure of configuring resources for the UE. (As mentioned above, in the prior art, the UE needs to send two MEASUREMENT REPORT messages. In addition, the UE sends a MEASUREMENT REPORT message carrying the traffic volume result only after performing state transition to Cell_FACH state.)

In addition, the scheduling indication that the UE in other states sends to the NodeB may include the TEBS information. Thus, the preceding embodiments not only overcome the delay in the resource configuration of the UE in Cell_PCH state, but also solve similar problems that occur when the UE in other states performs state switching.

In this embodiment, another threshold may also be set; when the numeric value of the TEBS field of the UE is smaller than the threshold, indicating that the current data transmission amount of the UE is small, the NodeB reports another indication to the RNC according to this comparison result; the RNC reconfigures resources for the UE according to the indication, that is, the RNC configures fewer resources for the UE, thus saving network resources.

In this embodiment, the RNC may also set the NodeB to periodically report information such as the Transport Channel Traffic Volume of the UE or the total amount of buffer occupancy at the RLC layer of the UE, so that the RNC may immediately know the usage conditions of the transmission channel resources of the UE. In this way, the RNC may dynamically configure and adjust the resources of the UE, thus utilizing the resources effectively. Further, if the uplink transmission channel used by the UE is an E-DCH, the RNC knows the overall resource utilization in the current cell by knowing the allocation and/or usage of common E-DCH resources on the NodeB, thus utilizing the resources in the cell effectively.

Through the descriptions of the preceding embodiments, those skilled in the art may understand that the present invention may be implemented by using hardware only or by using software and a necessary universal hardware platform. Based on such understandings, the technical solution of the present invention may be embodied in the form of a software product. The software product may be stored in a nonvolatile storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention.

The above descriptions are merely preferred embodiments of the present invention, but not intended to limit the scope of the present invention. Any modification, equivalent replacement, or improvement made without departing from the spirit and principle of the present invention should fall within the scope of the present invention.

What is claimed is:

1. A method for a user equipment (UE) to trigger a network device to configure resources for the UE, comprising:

measuring, by the UE when the UE is in a Cell_Paging Channel (Cell_PCH) state, a quantity of at least one of a Transport Channel Traffic Volume (TCTV) of the UE and a total amount of buffer occupancy (TABO) at a radio link control (RLC) layer of the UE;

incorporating, by the UE when the UE is in the Cell_PCH state, an indication of the measured quantity into a MEASUREMENT REPORT when the measured quantity exceeds a configured threshold, the MEASUREMENT REPORT being pre-designated for triggering the network device to transition the UE from the Cell_PCH state to a Cell_Forward Access Channel (Cell_FACH) state regardless of incorporation of the indication of the measured quantity;

transmitting, by the UE when the UE is in the Cell_PCH state, the indication via the MEASUREMENT REPORT to the network device when the measured quantity exceeds the configured threshold, the transmission of the indication via the MEASUREMENT REPORT being designated to trigger the network device to configure a dedicated transport channel for use by the UE after the UE is moved to the Cell_FACH state; and performing, by the UE, state transition from the Cell_PCH state to the Cell_FACH state.

2. The method of claim 1, wherein the indication indicates that the UE complies with a 4a event.

3. The method of claim 2, wherein the indication is used to identify the TCTV of the UE or the TABO at the RLC layer of the UE.

4. The method of claim 1, wherein the indication is an indication identifier, and the indication identifier is set to true when the measured quantity exceeds the configured threshold.

5. The method of claim 4, step further comprising:
incorporating, by the UE when the UE is in the Cell_PCH state, the indication identifier set to false into the MEASUREMENT REPORT when the measured quantity is one of at and below the configured threshold; and
transmitting, by the UE when the UE is in the Cell_PCH state, the indication identifier set to false via the MEASUREMENT REPORT to the network device when the measured quantity is one of at and below the configured threshold, the transmission of the indication identifier set to false via the MEASUREMENT REPORT being designated to avoid triggering the network device to configure a dedicated transport channel for use by the UE after the UE is moved to the Cell_FACH state.

6. The method of claim 4, wherein the indication is used to identify the TCTV of the UE or the TABO at the RLC layer of the UE.

7. The method of claim 1, wherein the indication is used to identify the TCTV of the UE or the TABO at the RLC layer of the UE.

8. The method of claim 1, before the incorporating step, further comprising:
determining, by the UE when the UE is in the Cell_PCH state, whether the measured quantity exceeds the configured threshold or not.

9. User equipment (UE) for triggering a network device to configure resources for the UE, comprising a processor and a sender, wherein:
the processor is configured to:
when the UE is in a Cell_Paging Channel (Cell_PCH) state, measure a quantity of at least one of a Transport Channel Traffic Volume (TCTV) of the UE and a total amount of buffer occupancy (TABO) at a radio link control (RLC) layer of the UE, and
when the UE is in the Cell_PCH state, incorporate an indication of the measured quantity into a MEASUREMENT REPORT when the measured quantity exceeds a configured threshold,
the MEASUREMENT REPORT being pre-designated for triggering the network device to transition the UE from the Cell_PCH state to a Cell_Forward Access Channel (Cell_FACH) state regardless of incorporation of the indication of the measured quantity;

the sender is configured to:
when the UE is in the Cell_PCH state, transmit the indication via the MEASUREMENT REPORT to the network device when the measured quantity exceeds the configured threshold, the transmission of the indication via the MEASUREMENT REPORT being designated to trigger the network device to configure a dedicated transport channel for use by the UE after the UE is moved to the Cell_FACH state; and the processor is further configured to:
perform state transition from the Cell_PCH state to the Cell_FACH state.

10. The UE of claim 9, wherein
the indication indicates that the UE complies with a 4a event.

11. The UE of claim 9, wherein
the indication is an indication identifier, and the indication identifier is set to true when the measured quantity exceeds the configured threshold.

12. The UE of claim 11, wherein
the processor is further configured to:
when the UE is in the Cell_PCH state, incorporate the indication identifier set to false into the MEASUREMENT REPORT when the measured quantity is one of at and below the configured threshold; and
the sender is further configured to:
when the UE is in the Cell_PCH state, transmit the indication identifier set to false via the MEASUREMENT REPORT to the network device when the measured quantity is one of at and below the configured threshold, the transmission of the indication identifier set to false via the MEASUREMENT REPORT being designated to avoid triggering the network device to configure a dedicated transport channel for use by the UE after the UE is moved to the Cell_FACH state.

13. The UE of claim 9, wherein
the indication is used to identify the TCTV of the UE or the TABO at the RLC layer of the UE.

14. The UE of claim 9, wherein the processor is further configured to:
when the UE is in the Cell_PCH state, determine whether the measured quantity exceeds the configured threshold before incorporating the indication into the MEASUREMENT REPORT.

15. A system comprising: a user equipment (UE) and a network device, wherein the UE comprises a processor and a transmitter, wherein:
the processor is configured to:
when the UE is in a Cell_Paging Channel (Cell_PCH) state, measure a quantity of at least one of a Transport Channel Traffic Volume (TCTV) of the UE and a total amount of buffer occupancy (TABO) at a radio link control (RLC) layer of the UE, and
when the UE is in the Cell_PCH state, incorporate an indication of the measured quantity into a MEASUREMENT REPORT when the measured quantity exceeds a configured threshold,
the MEASUREMENT REPORT being pre-designated for triggering the network device to transition the UE from the Cell_PCH state to a Cell_Forward Access Channel (Cell_FACH) state regardless of incorporation of the indication of the measured quantity;

the transmitter is configured to:
when the UE is in the Cell_PCH state, transmit the indication via the MEASUREMENT REPORT to the network device when the measured quantity exceeds the configured threshold, the transmission of the indication via the MEASUREMENT REPORT being designated to trigger the network device to configure a dedicated transport channel for use by the UE after the UE is moved to the Cell_FACH state; and the processor is further configured to:
perform state transition from the Cell_PCH state to the Cell_FACH state.

16. The system of claim 15, wherein
the indication indicates that the UE complies with a 4*a* event.

17. The system of claim 15, wherein
the indication is an indication identifier, and the indication identifier is set to true when the measured quantity exceeds the configured threshold.

18. The system of claim 17, wherein
the processor is further configured to:
when the UE is in the Cell_PCH state, incorporate the indication identifier set to false into the MEASUREMENT REPORT when the measured quantity is one of at and below the configured threshold; and the transmitter is further configured to:
when the UE is in the Cell_PCH state, transmit the indication identifier set to false via the MEASUREMENT REPORT to the network device when the measured quantity is one of at and below the configured threshold, the transmission of the indication identifier set to false via the MEASUREMENT REPORT being designated to avoid triggering the network device to configure a dedicated transport channel for use by the UE after the UE is moved to the Cell_FACH state.

19. The system of claim 15, wherein the
the indication is used to identify the TCTV of the UE or the TABO at the RLC layer of the UE.

20. The system of claim 15, wherein the processor is further configured to:
when the UE is in the Cell_PCH state, determine whether the measured quantity exceeds the configured threshold before incorporating the indication into the MEASUREMENT REPORT.

\* \* \* \* \*